Figure 1:
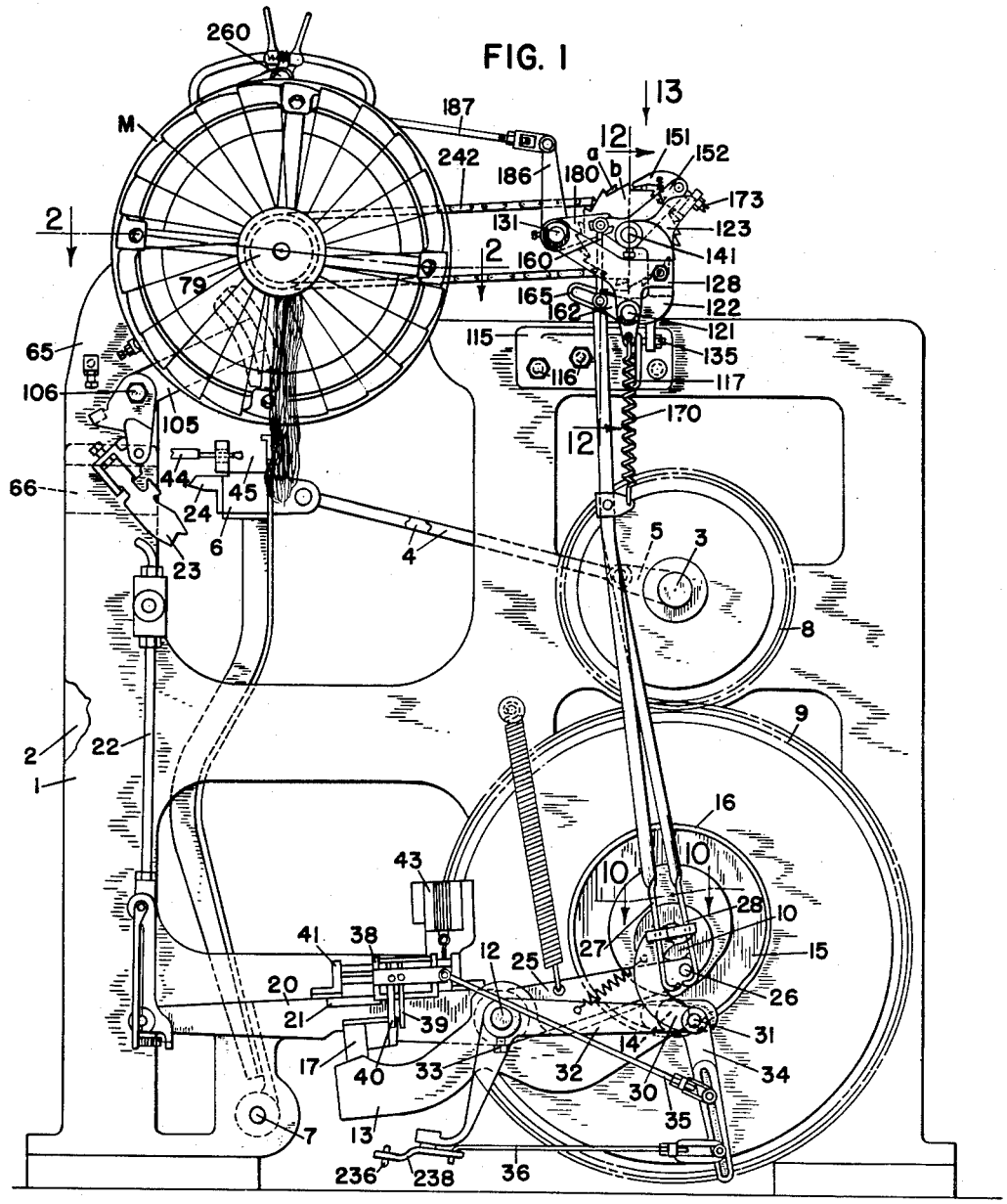

July 17, 1956 C. P. BERGSTROM 2,754,854
WEFT REPLENISHING LOOM WITH ROTARY MAGAZINE
Filed Dec. 30, 1954 7 Sheets-Sheet 1

INVENTOR
CARL P. BERGSTROM
Chas. T. Hawley
ATTORNEY

July 17, 1956
C. P. BERGSTROM
2,754,854
WEFT REPLENISHING LOOM WITH ROTARY MAGAZINE
Filed Dec. 30, 1954
7 Sheets-Sheet 2
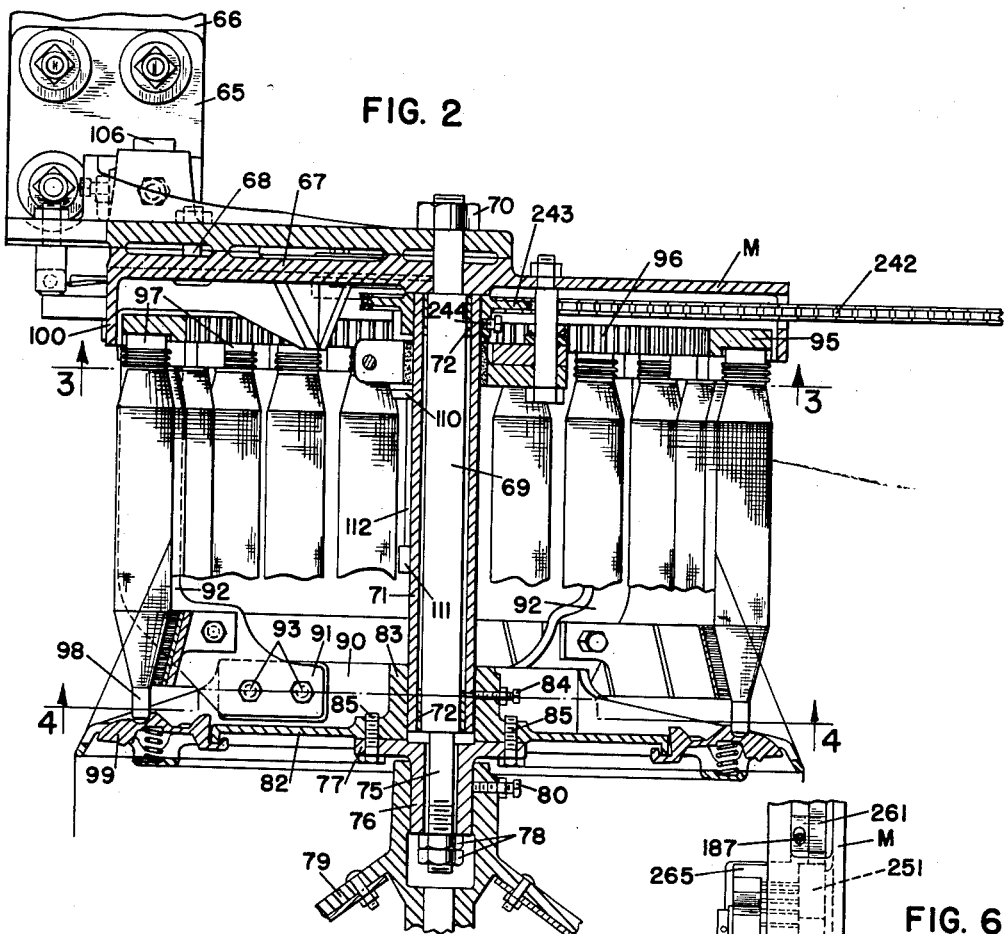
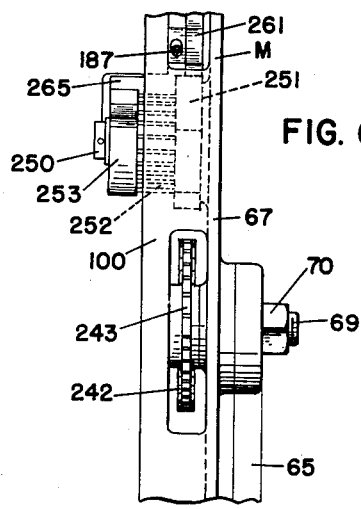
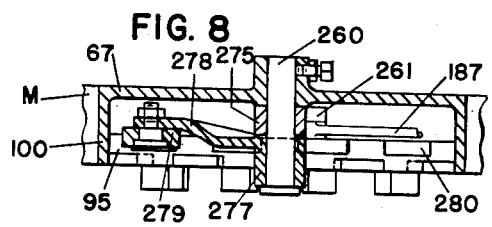
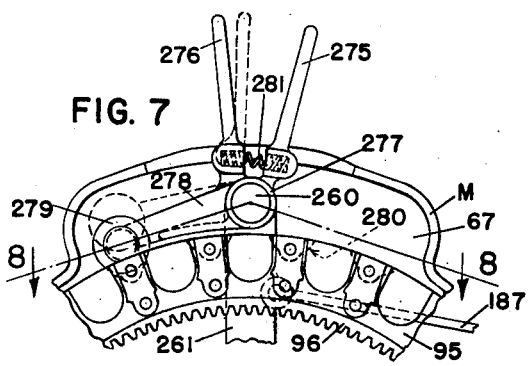
INVENTOR
CARL P. BERGSTROM
Chas. T. Hawley
ATTORNEY July 17, 1956  C. P. BERGSTROM  2,754,854
WEFT REPLENISHING LOOM WITH ROTARY MAGAZINE
Filed Dec. 30, 1954  7 Sheets-Sheet 3

INVENTOR
CARL P. BERGSTROM
Chas. F. Hawley
ATTORNEY

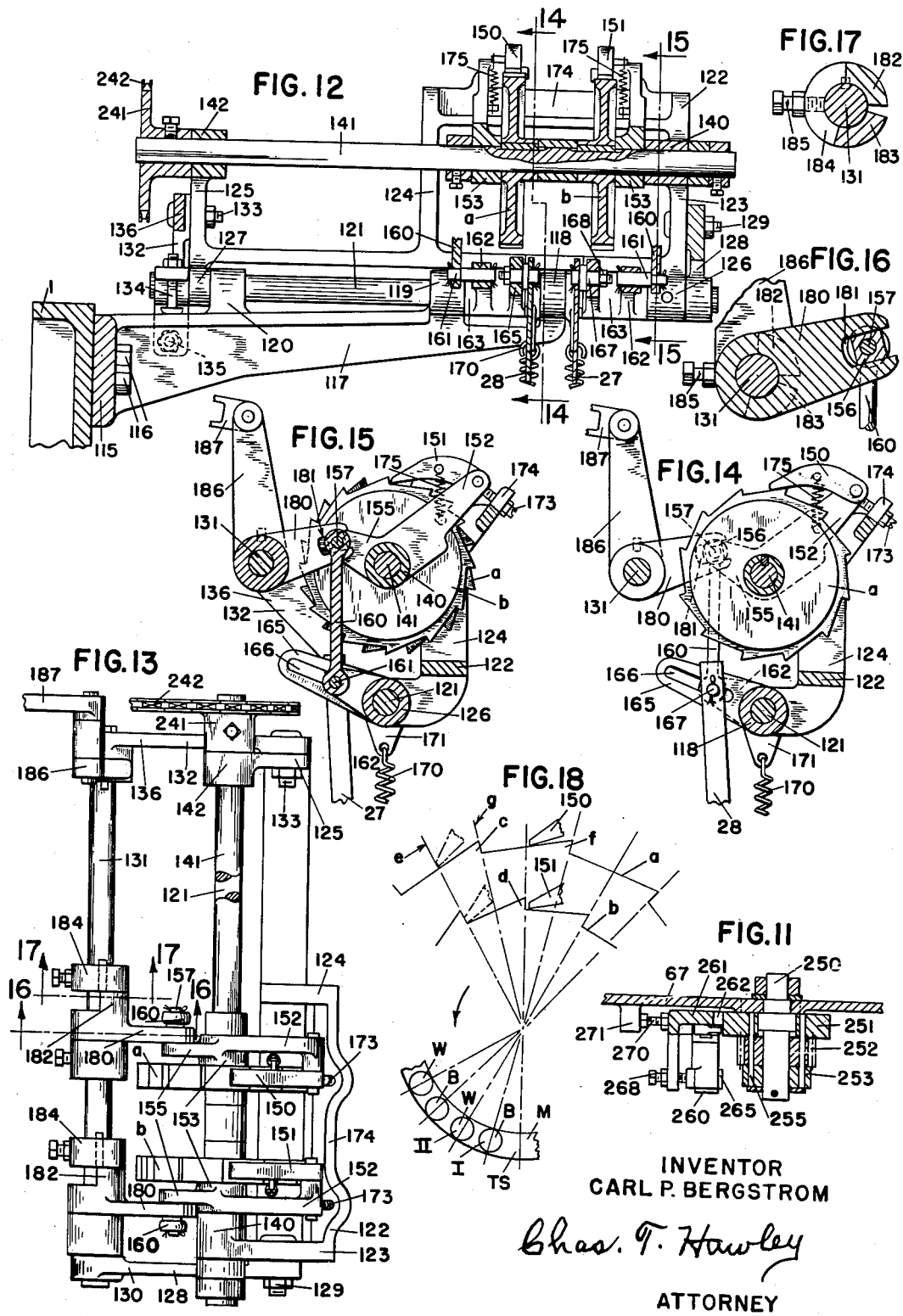

July 17, 1956
C. P. BERGSTROM
2,754,854
WEFT REPLENISHING LOOM WITH ROTARY MAGAZINE
Filed Dec. 30, 1954
7 Sheets-Sheet 5
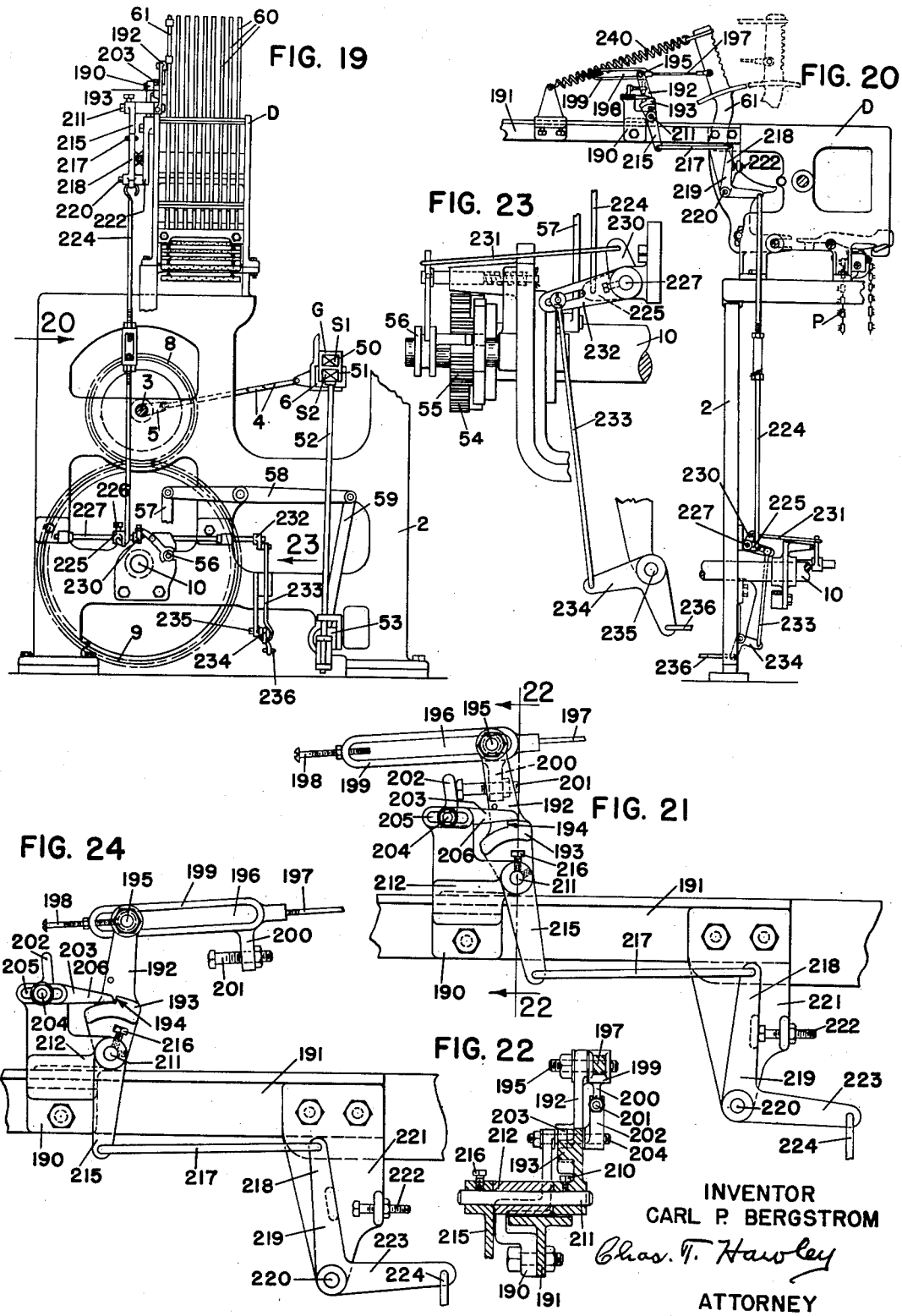
INVENTOR
CARL P. BERGSTROM
Chas. T. Hawley
ATTORNEY

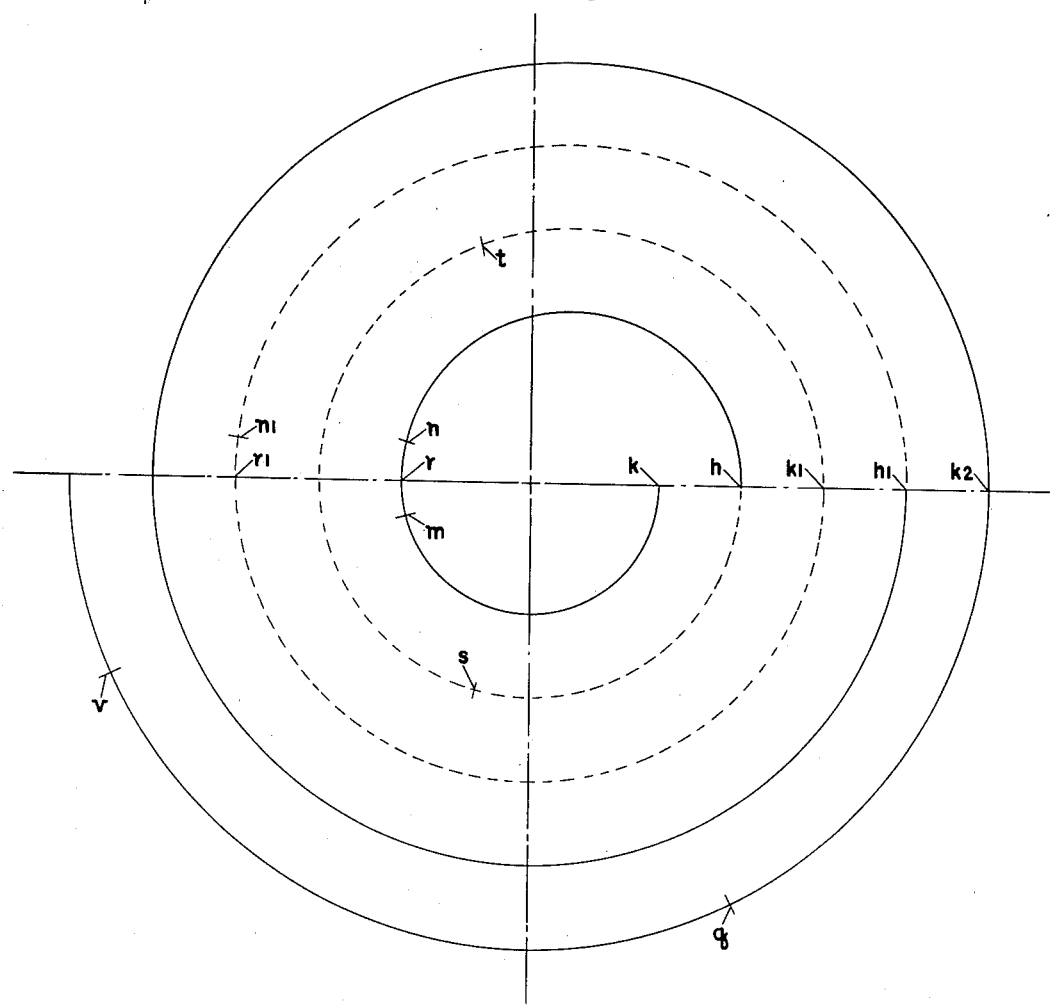

July 17, 1956   C. P. BERGSTROM   2,754,854
WEFT REPLENISHING LOOM WITH ROTARY MAGAZINE
Filed Dec. 30, 1954   7 Sheets-Sheet 7
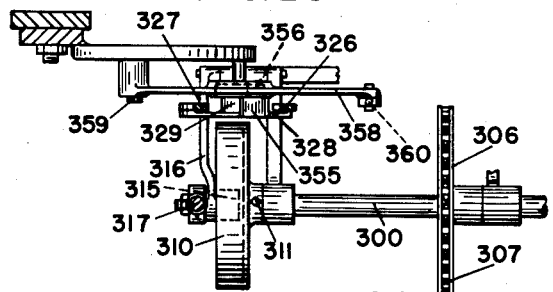
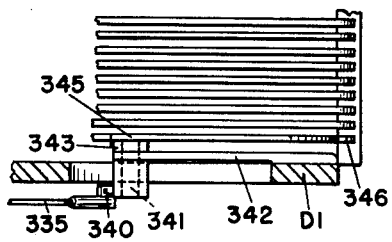
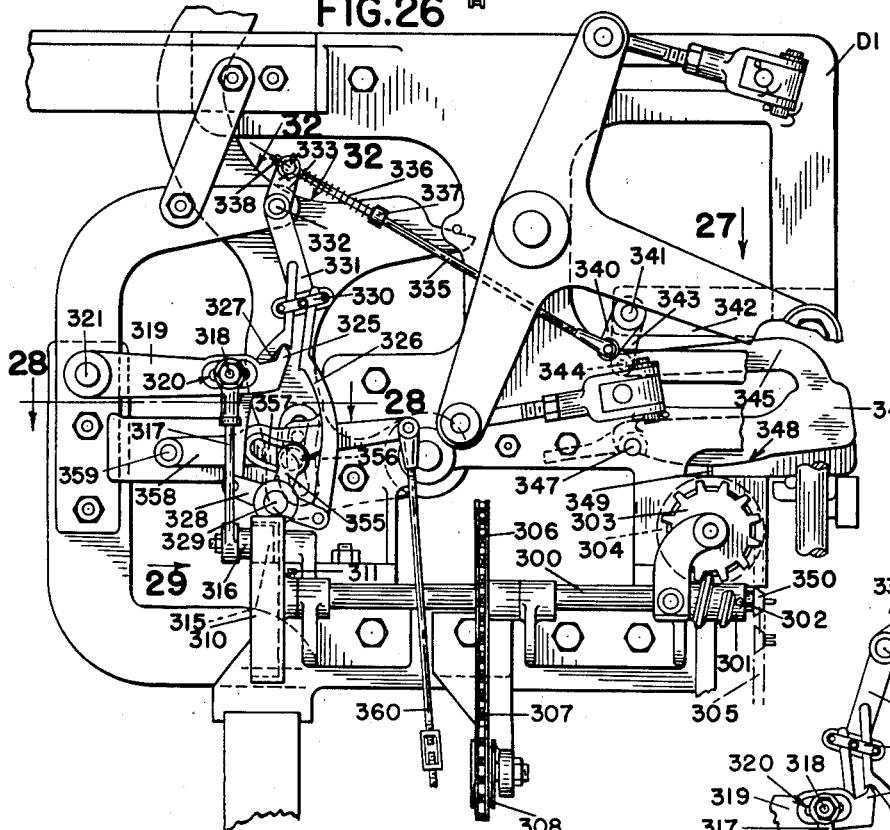
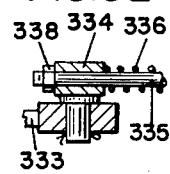
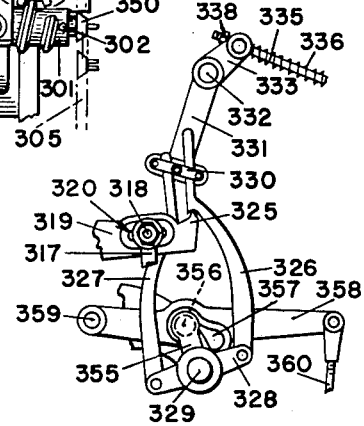
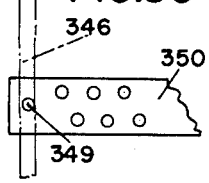
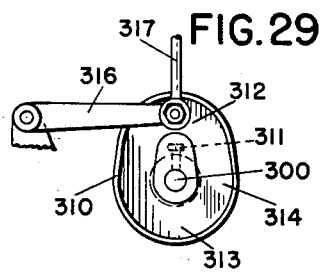
INVENTOR
CARL P. BERGSTROM
Chas. T. Hawley
ATTORNEY

United States Patent Office 2,754,854
Patented July 17, 1956

2,754,854
WEFT REPLENISHING LOOM WITH ROTARY MAGAZINE

Carl P. Bergstrom, Millbury, Mass., assignor to Crompton & Knowles Loom Works, Worcester, Mass., a corporation of Massachusetts Application December 30, 1954, Serial No. 478,689

19 Claims. (Cl. 139—232)

This is a continuation in part of my co-pending application, Serial No. 390,922, filed November 9, 1953, now abandoned.

This invention relates to weft replenishing looms more particularly of the type provided with a rotary reserve bobbin magazine and operating with two shuttles either of which can be active while the other is inactive.

As constructed and operated heretofore looms of the type to which this invention more particularly relates have had bobbins of distinctive characteristics arranged in groups in the rotary magazine, each group having a bobbin corresponding to one of the shuttles. Whenever a transfer occurred involving one bobbin of a group it was necessary to shift the magazine to bring a new group into action, always leaving a bobbin of the group untransferred. As a result of this mode of operation it has never been possible heretofore to transfer more bobbins from the magazine than the number of groups of bobbins.

It is an important object of the present invention to provide a magazine in which bobbins of distinctive characteristics alternate with each other, but wherein, provided the shuttles become exhausted of their weft supply in a given order, it will be possible to make more transfers of bobbins than there are pairs of bobbins in the magazine. Thus, if a black bobbin is next to the normally unoccupied transfer station and a white bobbin is beyond the black bobbin with respect to the station these two will constitute a primary or initial pair and if the black bobbin is transferred it will then be possible at a later time to transfer also the white bobbin provided the shuttle carrying white weft is the next shuttle to become exhausted. After the black bobbin is transferred the bobbin nearest the transfer station will be white and the bobbin beyond it black, so that these last two bobbins constitute a secondary or different group arranged in an order the reverse of the order which existed prior to transfer of the black bobbin.

It is a further object of the invention to provide two feed devices, such as ratchets, each having a feed pawl and arrange the ratchets so that their teeth are staggered with respect to each other by an angular distance equal to one-half the angular space occupied by a ratchet tooth. Each ratchet and its pawl will correspond to one of the shuttles. The pawls both have the same extent of feeding stroke and depending upon the position of the teeth of either ratchet the corresponding pawl will be able to give the ratchet a motion corresponding to a shift of the magazine equal to the space occupied by one bobbin, or the space occupied by two bobbins as the case may be. The two ratchets move in unison and turn the magazine through a one or two bobbin space, depending upon whether the actuated ratchet receives a half or full working stroke of its pawl.

The mechanism which controls the working of magazines provided with groups of bobbins has in the past been operated from the shifting shuttle boxes of the loom.

In those instances in which the magazine rocks with every shift of the shuttle box there is undesirable and useless motion on the part of the magazine, and in those instances where the magazine is normally at rest but is rocked when replenishment is required the time for rocking has been governed by the shuttle boxes, completion of the shuttle box shift being necessary before rocking of the magazine can begin. The time elapsing between completion of a box shift and the transfer of a bobbin under these conditions is usually less than one beat of the loom or rotation of the crank shaft and this condition produces a too rapid motion of the magazine.

It is a further important object of the present invention to initiate rocking of the magazine earlier in the loom cycle than has been possible heretofore. This is accomplished by deriving control for the time at which a train of mechanism can be set into motion to rock the magazine from a mechanism which determines in advance whether or not the shuttle boxes are to shift. The mechanism which effects the shifting of the shuttle boxes is controlled by a pattern chain which acts through intermediate connections to set the box shifting mechanism for a shifting operation at an earlier time in the cycle of the loom than the beginning of the box shift. This control mechanism ordinarily completes its work some time prior to the actual beginning of the box shift and by determining whether or not the magazine shall be rocked from this control mechanism considerably more time is available than heretofore to rock the magazine and it can therefore move at a slower rate which is favorable to accurate positioning of the magazine. As will be set forth hereinafter the actual time available for operating the train of mechanism which rocks the magazine is approximately twice that which is available in former looms wherein rocking of the magazine cannot begin until after completion of the box shift.

The warp shedding mechanism of some looms is operated by a dobby having jacks which are moved by reciprocating knives and hooks under control of a pattern chain. It is a further object of the invention to set the shuttle box control mechanism for operation by a jack of the dobby which also positions a selector mechanism which determines whether or not a replenishing operation is to occur. The selector mechanism shown herein is similar to that which has already been used on certain types of looms but differs from previous selector mechanisms in that it is in position to cooperate with other parts of the loom at an earlier time in the loom cycle than heretofore.

The previously mentioned dobby jack will ordinarily be in motion when the weft detector operates as the lay reaches front center, and in order to prevent movement of the selector mechanism by the jack at this time it is a further object of the invention to provide a lost motion connection by which the jack does not move the selector mechanism until after the weft detector has had time to operate.

In the weaving of some fabrics it is desirable to effect a crossing of the warps while the lay in its forward beat is a considerable distance from front center. In order to effect this early crossing it is necessary to change the time of the dobby with respect to the loom by altering the angular position of the dobby operating crank with respect to the bottom shaft of the loom. When such an adjustment of the dobby time is made and the indication for the boxes and the selector mechanism of the weft replenishing mechanism are controlled from a dobby jack an adjustment is also required in order to obtain the correct time of operation for the indication of the boxes and the positioning of the color selector.

The usual dobby is provided with a small horizontal shaft to which is secured a worm which drives a worm gear the turning of which causes feeding of the pattern chain. This shaft is generally driven by the top shaft of the loom and is therefore kept in time with the loom. When a change is made in the time of the dobby the worm can if necessary be adjusted angularly with respect to the small shaft. It is an important object of the modified form of the invention to provide means actuated from the small horizontal shaft and therefore independently of adjustment of the worm and dobby time for calling the indications for the box motion and also determining the position of the color selector.

In order that the modified form of mechanism may be easily controlled it is a further object of the invention to employ a finger of the dobby to determine the position of two hooks relative to an actuator knife forming part of the modified form of the invention. As shown herein the dobby finger is altered from the usual form of finger and although it may give its indication early in loom time the actuator knife will operate at a later time consistent with permitting the weft detector to perform its operation before the selector mechanism is moved.

Figure 10:
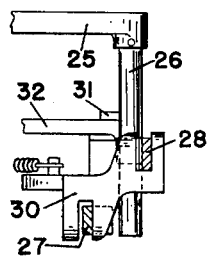
Figure 3:
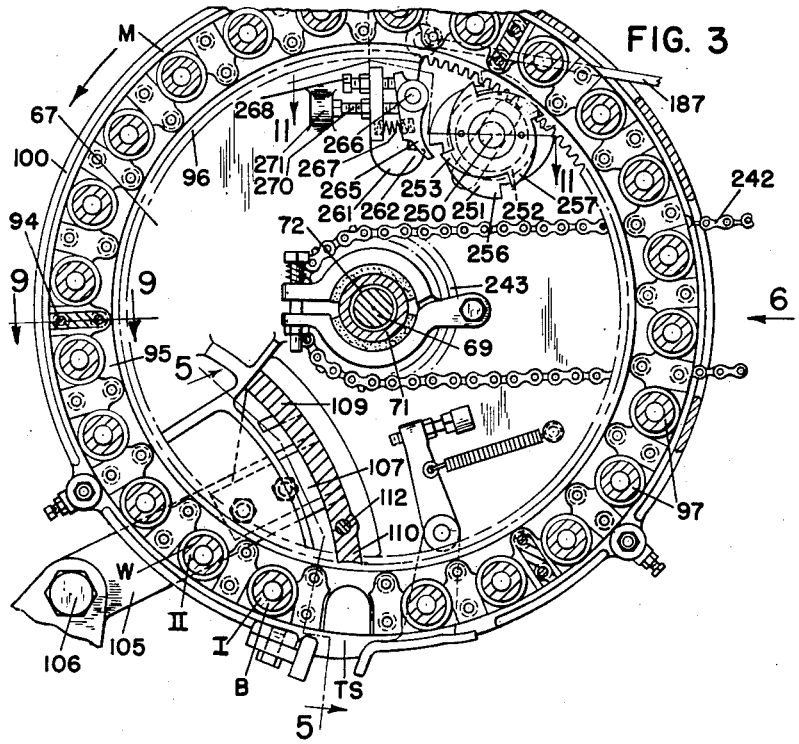
Figure 9:
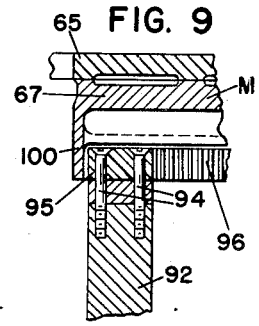
Figure 4:
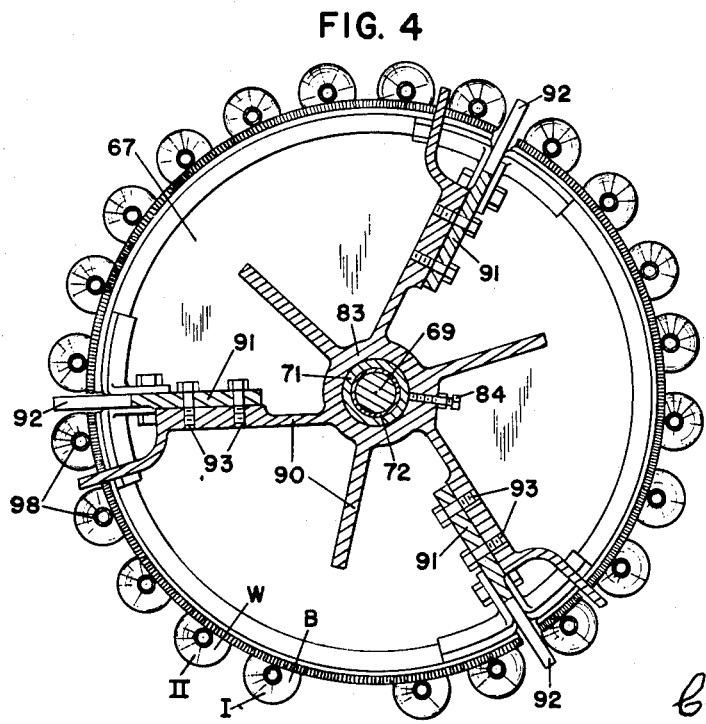
Figure 5:
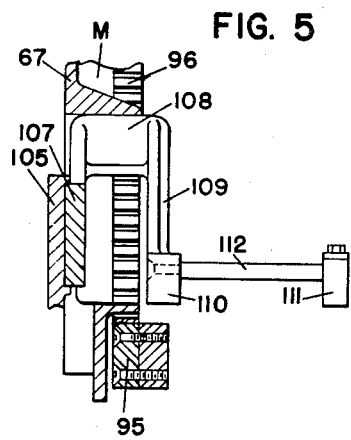

In order that the invention may be clearly understood reference is made to the accompanying drawings which illustrate by way of example two embodiments of the invention and in which:

Fig. 1 is a side elevation of the right hand or weft replenishing end of the loom, Fig. 2 is an enlarged horizontal section on line 2—2, Fig. 1, Figs. 3 and 4 are vertical sections on lines 3—3 and 4—4, respectively, Fig. 2, Fig. 5 is a detailed section on line 5—5, Fig. 3, showing parts of the bobbin transfer mechanism, Fig. 6 is a fragmentary rear elevation looking in the direction of arrow 6, Fig. 3, Fig. 7 shows on an enlarged scale the upper part of Fig. 1, Fig. 8 is a section on line 8—8, Fig. 7, Fig. 9 is a detailed horizontal section on line 9—9, Fig. 3, Fig. 10 is an enlarged detailed horizontal section on line 10—10, Fig. 1, Fig. 11 is a detailed horizontal section on line 11—11, Fig. 3, Fig. 12 is an enlarged vertical section on line 12—12, Fig. 1, Fig. 13 is an enlarged plan view looking in the direction of arrow 13, Fig. 1, Figs. 14 and 15 are detailed vertical sections on lines 14—14 and 15—15, respectively, Fig. 12, Figs. 16 and 17 are enlarged vertical sections on lines 16—16 and 17—17, respectively, Fig. 13, Fig. 18 is a diagrammatic view showing the relation between the two ratchets for turning the magazine and their pawls, Fig. 19 is a side elevation of the left hand or dobby end of the loom showing the preferred form of control for the selector mechanism and shifting shuttle boxes, Fig. 20 is a rear elevation looking in the direction of arrow 20, Fig. 19, Fig. 21 is an enlarged view of the upper part of Fig. 20, Fig. 22 is a vertical section on line 22—22, Fig. 21, Fig. 23 is an enlarged detailed view of the shuttle box operating mechanism looking in the direction of arrow 23, Fig. 19, Fig. 24 is a view similar to Fig. 21 but with the parts in a different position, Fig. 25 is a diagram setting forth the operation of the invention of four successive beats of the loom, Fig. 26 is a rear elevation of a dobby and parts connected thereto showing a modified form of the invention in which the indication for the box motion and the position of the color selector is determined independently of the timing of the dobby, Fig. 27 is a fragmentary plan view looking in the direction of arrow 27, Fig. 26, Fig. 28 is a horizontal section of line 28—28, Fig. 26, Fig. 29 is a fragmentary view looking in the direction of arrow 29, Fig. 26, showing the cam which is part of the mechanism which indicates the box motion and determines the position of the selector, Fig. 30 is a diagrammatic plan view of one of the bars of the pattern chain and the modified finger which is also part of the mechanism for indicating the box motion and determining the selector position, Fig. 31 is a diagrammatic view showing parts of the structure set forth in Fig. 26 but in a different position, and Fig. 32 is an enlarged section on 32—32, Fig. 26.

Referring particularly to Fig. 1, the loom frame includes right and left hand loomsides 1 and 2 on which is rotatably mounted a top or crank shaft 3 which by means of connectors 4 and crank 5 oscillate the lay 6 around the lay rocker shaft 7. Shaft 3 can be driven in any approved manner and completes a rotation once for each pick or beat of the loom or complete reciprocation of the lay. A gear 8 turning with shaft 3 meshes with gear 9 of twice its size secured to the bottom shaft 10 of the loom which completes a rotation every second beat of the loom.

The right hand end of the loom as shown in Fig. 1 is provided with a stationary stud 12 on which is pivotally mounted a lever 13, the right hand end of which as viewed in Fig. 1 is provided with a roll 14 fitting into the groove 15 of a cam 16 secured to the bottom shaft 10. The left hand end of actuator lever 13 is provided with a latch 17 and as the cam 16 rotates during loom operation the latch will rise and fall ordinarily with an idle motion. Also pivoted on stud 12 is a setting lever 20 which is normally at rest and is provided with a lug 21 for engagement with the latch 17 when a weft replenishing operation of the loom is to occur. The left hand end of lever 20 is connected to an upwardly extending rod 22 which raises a transferrer latch or dog 23 into the patch of a bunter 24 on the lay when a bobbin is to be transferred. Ordinarily the rod 22 is in low position so that the dog 23 will be in the down position shown in Fig. 1, but when rod 22 is raised the dog is lifted into engaging position with respect to the bunter to be moved forwardly by the lay as the latter approaches front center position.

The rear arm 25 of lever 20 is provided with a laterally extending stud 26 for cooperation with either a front hook 27 or rear hook 28, depending upon the positions of the hooks when the stud 26 moves down. The hooks pass through the upper end of a placing lever 30 which rocks on a stud 31 on a support 32 fastened by set screw 33 on the stud 12. The lower arm 34 of lever 30 is connected to rods 35 and 36 as shown in Fig. 1.

A weft exhausting indication storing mechanism 38 having right and left hand fingers 39 and 40, respectively, is slidable on a guide 41 secured to lever 20 and is connected to the left hand end of rod 35, see Fig. 1. An electric solenoid 43 is electrically connected to a weft detector 44 by connections not shown but well understood so that whenever a shuttle in shuttle box 45 on the right hand end of the lay is depleted of weft the solenoid will be energized for the purpose of moving one or the other of the fingers 39 or 40, depending upon the position of the slide 38, from normal position to indicated position.

The left hand end of the lay shown in Fig. 19 in the present instance is provided with a gang G of two shifting shuttle boxes 50 and 51 for shuttles S1 and S2, respectively. The shuttle boxes are mounted on a box lifter rod 52 which extends downwardly and is operatively connected to a shuttle box lifting and lowering mechanism 53. This mechanism is of well-known construction and may be similar to those shown for instance in Patents Nos. 786,232 and 1,874,615. Mechanism 53 includes a master segmental gear 54 secured to the bottom shaft and having gear teeth around approximately one-quarter of its periphery for the operation of a pinion 55. The pinion 55 is provided with a sliding member 56 which operates when in one position to cause a connector 57 to move upwardly to rock a box lever 58 in a clockwise direction as viewed in Fig. 19 so that a link 59 connected to the box rod 52 will lower the gang G so that shuttle box 50 and shuttle S1 will be in active position, and when the slide member 56 is in the other position thereof the same mechanism will cause the gang G to rise so that box 51 and shuttle S2 will be active. The gang G, if it is to be moved, will shift during a period when the lay is in the forward part of its motion and is moving approximately from bottom center through front center to the top center position thereof. The box shifting period of the gang G can occur only on alternate beats of the loom when both shuttles are in the gang.

The means for controlling the warp not shown is the well-known dobby mechanism D, Fig. 19, having several harness controlling jacks 60. In the present instance the rearmost jack 61 is used to control the shuttle box shift mechanism 53. The jacks 60 and 61 are controlled from a pattern chain P in usual manner and when they are required to move will rock either to the right or left, Fig. 20, during the greater part of a one pick cycle starting when the lay is approximately on back center.

Except as noted hereinafter the mechanism thus far described operates in usual manner, the shuttles being picked one at a time by picking mechanism not shown from the gang G into the shuttle box 45 while the lay is in the rear part of its motion on one beat of the loom and being picked back from box 45 to the corresponding box in gang G on the next beat of the loom. Whenever a shuttle is in the box 45 the weft detector 44 determines the condition of its weft and if the latter is depleted the solenoid will then be energized to move one or the other of the fingers 39 or 40 from their normal position to an indicating position in which they can at the correct time in loom operation cause the latch 17 to be deflected under the lug 21. The time in the cycle at which this deflection of the latch 17 occurs is earlier than has been the case heretofore in looms utilizing the type of mechanism shown in the lower part of Fig. 1. For further details of the structure of this mechanism, except for the cam 16, reference may be had to Patents Nos. 2,054,174; 2,054,192; and 2,358,905.

The reserve bobbin magazine in the present instance is of the rotary type and is designated generally at M. A support 65 is secured to the breast beam 66 forming part of the loom frame and has a plate 67 secured thereto as by bolts 68 one of which is shown in Fig. 2. A horizontal stud 69 is held in fixed position with respect to the support 65 and plate 67 by nut 70 and is surrounded by a sleeve 71 spaced from but held concentric with the stud 69 by bushings 72. The lower end of the stud 69 as viewed in Fig. 2 is reduced as at 75 and has the hub 76 of a disk 77 secured thereto by nuts 78. A thread holder 79 of usual construction is secured to the hub 76 by a set screw 80.

A second disk 82 has a hub 83 secured by set screw 84 to the sleeve 71. The disks 77 and 82 are secured to each other by screws 85 and rotate with the sleeve 71. The disk 82 has veins 90 to which are secured the feet 91 of horizontally extending supports 92. Screws 93 may be employed to secure the feet 91 to the veins. The supports 92 extend from the outer part of the magazine toward the inner end thereof and are fastened by screws 94, see Fig. 9, to a ring 95 the inner periphery of which is provided with gear teeth 96. The ring 95 supports the head or butt ends 97 of the bobbins in the magazine while the tip ends 98 of the bobbins are held by a well-known type of bobbin tip support 99 shown for instance in Fig. 2 and being supported jointly by the rings 77 and 82. The plate 67 has a circular flange 100 which extends from the plate beyond the ring as shown in Fig. 2 to assist in holding the butts 97 of the bobbins in position and prevent them from moving accidentally out of the magazine. This ring flange is interrupted at the lower part thereof at a transfer station TS, see Fig. 3, to allow the butt of a bobbin in the transfer station to move downwardly out of the magazine.

The bobbin transferrer arm 105 is pivoted to rock around a stud 106 stationary on the support 65 and has the previously described latch 23 pivoted thereto. The transferrer arm extends rearwardly and normally upwardly and has secured thereto a head 107 as shown in Fig. 5. The head has a bridge part 108 which is normally above the ring 95 and extended across the plane of the teeth 96. The right hand part of the bridge 108 as viewed in Fig. 5 has a depending arm 109 having a foot 110 to engage the butt of a bobbin and having a second foot 111 supported by a rod 112 on the foot 110 to engage the tip of a bobbin. Ordinarily the bridge 108 is at a considerable distance above the ring 95 so that when the latch 23 moves forwardly the transferrer arm 105 can move downwardly without interference on the part of the ring 95 to move a bobbin in the transfer station TS downwardly into a shuttle in box 45.

A support 115, see Fig. 12, is secured at 116 to the right hand loomside 1 behind the magazine and has a horizontally extending arm 117 having formed therewith three aligned bearings 118, 119 and 120 which support a rod 121. A carrier 122 has three upright arms 123, 124 and 125, the arms 123 and 125 having hubs 126 and 127, respectively, on rod 121. A support arm 128 is also mounted on the rod 121 and is bolted at 129 to the arm 123. A forwardly extending arm 130 on the arm 128 supports the outer end of a rock shaft 131. A second arm 132 secured at 133 to arm 125 of the carrier is supported on the inner end of rod 121, the left end as viewed in Fig. 12, and is provided with means for adjustment with respect to the support 115. One of these adjusting means is a stop screw 134 to engage the top of support 115 to limit the forward movement of the carrier 122, to the left as viewed in Fig. 15, and the second adjusting means is a stop screw 135 engaging a side of support 115 to limit movement of carrier 122 in the opposite direction. The arm 132 has a forwardly extending part 136 which supports the inner end of shaft 131. Arm 123 of the carrier has a hub 140 to support the outer end of a rotary shaft 141 and similarly arm 125 of the carrier has a hub 142 to support the inner end of the shaft 141. The support 115 therefore holds the rod 121 and through it affords support for the carrier 122 in adjusted angular position and the carrier supports the shaft 141. By reason of the screws 134 and 135 the back and forth position of shaft 141 can be adjusted with respect to the magazine.

Keyed to shaft 141 are two ratchet wheels $a$ and $b$, the wheels having the same number of teeth but the teeth of one ratchet being staggered by an amount equal to half the length of a ratchet tooth with respect to the teeth of the other ratchet, as is apparent in Fig. 15. Each ratchet wheel has a driving pawl, the pawls for ratchets $a$ and $b$ being designated at 150 and 151. Each pawl is mounted on a lever 152 having a hub 153 rockable on shaft 141. Each lever 152 has an arm 155 provided with a block 156 pivoted on stud 157 on the arm. The stud 157 is pivoted to the upper end of a rod 160 the lower end of which is pivoted to another stud 161 on an arm 162 having a hub 163 rockable about rod 121. Hub 163 also has a second arm 165 slotted at 166 and receiving a stud 167 held in adjusted position along the slot by a nut 168, see Fig. 12. Each stud 167 is pivotally connected to the upper end of one or the other of the hooks 27 or 28, as the case may be. Each hook is connected to the lower end of a spring 170 the upper end of which is held as at 171 with respect to the rod 121. The springs normally tend to raise the hooks 27 and 28 the effect of which is to hold the pawls in their starting position against adjusting screws 173 on a cross bar 174 forming part of the carrier 122. Each pawl has a spring 175 connected between it and its lever 152 tending to hold the pawl down on its ratchet wheel.

For each arm 152 there is provided an arm 180 pivoted on shaft 131 and having a slot 181 for sliding engagement with the previously mentioned block 156. Arm 180 has a lug 182 normally spaced from a lug 183 on a collar 184 secured by set screw 185 to the shaft 131. When arm 180 turns clockwise, Fig. 16, the first part of its motion will be idle until lug 182 engages lug 183, after which further turning of arm 180 will rock shaft 131 clockwise, Fig. 15. A stop controlling lever 186 turning with shaft 131 is connected at its upper end to a forwardly extending rod 187 the purpose of which will be set forth hereinafter.

The mechanism for controlling the endwise movement of the slide 38 on the guide 41 is shown in Figs. 19–24. A stand 190 on the rear arch 191 of the loom frame supports a lock mechanism shown more particularly in Figs. 21 and 22. This mechanism includes an upwardly extending arm 192 having a lateral lug 193 formed with a lock shoulder 194. The upper end of arm 192 is provided with a stud 195 extending through a slot 196 in a connector 197 the right hand end as viewed in Fig. 20 is pivoted to the previously described jack 61 and the left hand end of which is provided with an adjustable stop screw 198. The slot is formed in a rod head 199 on connector 197 and is formed with a depending finger 200 provided with an adjustable tripping screw 201 for engagement with the upper arm 202 of a lock lever 203 rockable on a stud 204 adjustable horizontally in a slot 205 in the stand 190. Lever 203 has a horizontal arm 206 for engagement with the shoulder 194.

The lower end of arm 192 is fastened by set screw 210 to a rock stub shaft 211 rotatable in a bearing 212 formed as part of the stand 190. A depending arm 215 is secured to the opposite end of shaft 211 by a set screw 216 and has its lower end connected to a rod 217 the right hand end of which, Fig. 20, is connected to the upright arm 218 of a bell crank lever 219 rockable on a stationary stud 220 carried by a stand 221 also secured to the loom arch 191. An adjusting stop screw 222 limits clockwise turning of the lever 219 as viewed in Fig. 1. The lever 219 has its other arm 223 connected to a depending rod 224 the lower end of which is pivoted to an arm 225 held by a set screw 226 to a horizontal shaft 227 rockable in bearings on the left hand loomside 2, see Fig. 19. The shaft 227 controls the sliding of member 56 by means of an arm 230 and rod 231.

Secured to the shaft 227 at the forward end thereof is an arm 232 connected by link 233 to a bell crank lever 234 rockable about a fixed pivot 235. The lower arm of lever 234 is connected to a rod 236 which extends across the loom and is connected to a bell crank lever 238, see Fig. 1, rockable on the previously described stand 32 and connected to the rod 36.

It is an important feature of the present invention to start as early as possible the train of events which result in rocking of the magazine if a bobbin changing operation is to occur. Before these events can start however it is necessary to enable the weft detector 44 to determine the condition of weft in the shuttle in box 45 and also allow time for shifting of the selector mechanism 38 if this shifting is necessary. The mechanism 38 must be kept stationary with the detector finger corresponding to the shuttle in box 45 in position to be tripped by the solenoid should the detector indicate weft exhaustion when the lay is on front center, but immediately after the indication is given by the detector the selector mechanism 38 can begin to move during an interval of loom time at the end of which the parts which turn the magazine can be set into motion. Since the gang G can shift during any of the previously described shifting periods with associated but earlier sliding of the mechanism 38 this interval must be provided for even though one or the other of the shuttles should remain in action after a bobbin changing operation.

The operation of the matter thus far described will be given in connection with Fig. 25 which indicates diagrammatically the sequence of operations for four successive beats of the loom in which each of the two shuttles will be active for two picks. The spiral line of the drawing is to be read clockwise and it is assumed that the beat of the loom starts at $k$ when the lay is on approximately back center and shuttle S1 is approaching the magazine end and is depleted of weft. Beginning at $k$ the dobby jack 61 will move to the left from the full line to the dotted line position shown in Fig. 20. The lay will reach its front center position at $r$ and the weft detector will perform its detecting operation during the time the lay is passing approximately from $m$ to $n$. The selector will be in the position thereof corresponding to shuttle S1 when the detector indicates weft exhaustion and it is to insure that the selector will be in this position that the rod 199 has the slot 196 to provide a lost motion on the part of the jack member 61 until the lay has reached at least the point $n$, whereupon the lost motion will be used up and continued motion of the jack will cause screw 198 to engage stud 195 to rock arm 192 to the right to move the selector to its other position corresponding to shuttle S2 and also set or indicate the box motion for the anticipated shift of gang G. The selector will be moved by the jack during an interval of loom operation extending approximately from $n$ to $h$ and when the lay next reaches the back center position indicated at $h$ the selector 38 will have come to rest and shuttle S1 will be moving away from the magazine end of the loom toward the shifting shuttle boxes. Latch 17 will then start up but will have an idle motion, and lock 203 will be in locking position with respect to lever arm 192, Fig. 24. The part of the diagram thus far described is indicated in a solid line.

The next two picks are indicated in broken lines and correspond to shuttle S2, which is not assumed to be depleted of weft. When shuttle S1 is boxed in the gang G the lay will be approximately at the point $s$ and the gang will shift from that point approximately to point $t$ to place shuttle S2 in action. At $k1$ shuttle S2 will be approaching the magazine end of the loom and the selector will be in its other position corresponding to shuttle S2 when the detector indicates at $r1$. Since shuttle S1 is to return to action the selector must be moved back to its original position by the time the lay reaches position $h1$. In order to call shuttle S1 back into action the jack 61 will move from the dotted line position to the full line position, Fig. 20, and this motion will begin when the lay is on back center at $k1$. The lever arm 192, being locked in the position shown in Fig. 24 will be held in that position and the first part of the left hand motion of the jack, Fig. 20, under action of spring 240 will be idle by reason of the slot 196 until the point $n1$ is reached, whereupon continued left hand motion of the jack will cause release or tripping screw 201 to engage arm 202 to unlock arm 192 and spring 240 will then move the selector back to its first position by the time the lay reaches the position $h1$. As soon as the selector is positioned at $h1$ the hooks 27 and 28 will be correctly placed and latch 17 will be started up by the cam 16, and will be deflected by the selector to engage lug 21 shortly after the point $h1$ and the mechanism for rocking the magazine will be set into motion. This mechanism continues to move from $h1$ through $k2$ and on to some such point as $q$, when the mechanism which rocks the magazine will come to rest. There may be some vibratory oscillation of the magazine which however will disappear between points $q$ and $v$, at which latter point the transferring operation of the bobbin which has been moved into the transfer station will actually begin.

If there had been no intervening shift of the gang G after shuttle S1 had given indication of weft exhaustion at $r$ the part of the cycle indicated in broken lines would not have occurred and the solid line ending at $h$ would continue along with the solid line beginning at $h1$. Under these conditions there would have been no motion of the selector mechanism, but it would be necessary nevertheless to allow for the interval when the selector would move, if called up to do so, before the latch 17 can start at $h1$.

The lost motion provided by the slot 196 therefore delays movement of the selector mechanism 38 by the jack until after the weft detecting operation whether the jack moves from the full line to the dotted line position, or from the dotted line to the full line position, Fig. 20, and without regard to the direction of rocking of the jack 61 the interval provided for sliding of the selector mechanism 38 will have been completed approximately at back center and motion of the train of mechanism causing rocking of the magazine will begin at that point.

It is to be understood that the harnesses may cross either slightly before or after front center, depending upon the character of fabric being woven and that the time at which the train of events leading to the rocking of the magazine begins will depend somewhat upon this condition. Thus, if the dobby is set to cross the harnesses before front center then the jack 61 will reach its position to the right, Fig. 2, before back center and somewhat more time than that already described will be available for rocking the magazine. Because of the condition just mentioned it is to be understood that the back center position referred to herein is approximate.

An important feature of the invention is that the two bobbins adjacent to the transfer station can both be transferred if their shuttles become depleted in the order in which the bobbins are spaced from the transfer station. Thus, referring to Fig. 18, it may be assumed that the bobbins are in the primary order black, white, black, white, etc. If the pawl 150 for ratchet $a$ is called into action it will rock the magazine an amount equal to a one bobbin space and move bobbin B from position I to the transfer station by the bobbin in position I will now be in position I and a B bobbin will be in position II. Thus, upon transfer of a bobbin from position I the order of the bobbins will be reversed. If the next shuttle to be replenished corresponds to the bobbin now in position I that bobbin will be transferred and both of the pairs of bobbins originally in positions I and II will have been used. If, on the other hand, the bobbin in position II had been transferred then bobbin B in position I would have moved to the right of the transfer station and could not be transferred, since the magazine always turns in the direction of the arrow indicated in Fig. 18.

In further explanation of the relation between the ratchets and the magazine, and referring to Fig. 18, the ratchet $a$ and its pawl 150 correspond to shuttle box 50 and shuttle S1, and ratchet $b$ and its pawl 151 correspond to shuttle box 51 and shuttle S2. Both pawls will have working strokes of the same extent which will begin with the pawls in the full line position and end at line $e$ in the dotted line position, Fig. 18. When the parts are set as indicated in Fig. 18 and replenishment of shuttle S1 is called, pawl 150 will move tooth $c$ for half a working stroke of the pawl to move a bobbin in position I of the magazine to the transfer position TS. If, on the other hand, shuttle S2 requires replenishment by a bobbin in position II then tooth $d$ will receive a full stroke from the pawl 151 and rock the magazine a space equal to two bobbins. When a ratchet is given a half movement by its pawl the other ratchet will also be given a half movement, and the relation of the ratchets with respect to the full stroke of the pawls will be reversed. Thus, when pawl 150 moves tooth $c$ to line $e$, Fig. 18, a new tooth $f$ will be placed to receive a full stroke at the next operation of pawl 150. Tooth $d$ will be moved to line $g$ so that when its pawl 151 has its next working stroke the ratchet $b$ will be given a motion equal to a one bobbin shift of the magazine.

Shaft 141 has secured thereto a sprocket wheel 241 meshing with the chain 242 trained around a sprocket wheel 243 secured at 244 to the sleeve 71 of the magazine. By the chain and its sprockets angular motion of shaft 141 caused by the pawls will rock the magazine in a manner already described.

In order that means may be provided to bring the magazine accurately to rest to position a bobbin correctly for transfer there is provided stop mechanism shown in Figs. 3, 7, 11 and 15. Referring to Fig. 11, a stud 250 fast with respect to an inner stationary plate of the magazine has rotatable thereon a stop ratchet 251, a pinion 252 and another stop ratchet 253. Pinion 252 meshes with the teeth 96 of the previously described ring 95 and being pinned to the stop ratchets as at 255 causes these ratchets to turn with it when the pinion is rotated on the stud 250 by teeth 96 due to turning of the magazine. The stop ratchet 251 has teeth 256 pointing in one direction while stop ratchet 253 has teeth 257 pointing in the opposite direction.

A stud 260 fixed wtih respect to one of the inner stationary plates of the magazine has mounted thereon a lever 261 the lower end of which is formed with a holding pawl tooth 262 for engagement with one or another of the teeth 256. A second holding pawl 265 for engagement with the teeth 257 is pivoted at 266 on lever 261 and has a spring 267 which holds the pawl against the stop screw 268 on lever 261. A second stop screw 270 adjustable on lever 261 is positioned for engagement with a stationary lug 271 on a stationary part of the magazine.

Lever 261 is connected to the previously described rod 187 and whenever shaft 131 is rocked incident to turning of the magazine as already described this rod will move to the right and move the holding pawls into position with respect to the teeth of their respective holding ratchets. Referring to Fig. 3, the holding pawl tooth 262 will engage a ratchet tooth 256 to prevent overrun of the magazine when it is turned by one of the actuating pawls 50 or 51, and holding pawl 265 will engage a tooth 257 to prevent rebound of the magazine. The lost motion between the lugs 182 and 183 permits the magazine to turn before the holding pawls engage their holding ratchets to stop the magazine. The matter just described with respect to prevent overrunning and rebounding of the magazine is described herein to complete the disclosure but is not claimed herein, being claimed in my co-pending application Serial No. 384,037, filed October 5, 1953.

The upper part of the magazine has applied thereto certain manual controls and also a positioning means shown more particularly in Figs. 1, 7 and 8. The lever 261 has projecting upwardly therefrom a handle 275, and a second handle 276 has a hub 277 on stud 260. Handle 276 is integral with an arm 278 which has rotatable thereon a roll 279 which fits into recesses or pockets 280 formed around the ring 95. A spring 281 is interposed between the handles 275 and 276 and has the effect of holding the roll 279 into whichever pocket 280 it registers with in order to hold the magazine yieldingly in stationary position between rocking movements thereof. The mechanism just described in connection with Figs. 7 and 8 may also be the same as that set forth in the copending application and is described here to complete the disclosure.

In the foregoing the position of the selector mechanism has been determined by the dobby jack 61 which also controls the indicating mechanism for the shuttle box operating means. This is a convenient arrangement but it may not be necessary in all instances to indicate the box operating means from the same dobby jack which controls the position of the selector mechanism. A dobby is ordinarily crank driven and it is for this reason that the jack 61 and the other jacks for the harnesses move throughout the greater part of a whole beat of the loom and it is because of this character of motion that the lost motion connection is necessary between the jack and the selector mechanism. If the jack 61 does not indicate the box motion it may then be considered as a member the chief purpose of which is to coordinate the position of the selector with the shuttles. In the type of loom described herein a called shuttle will be active for at least two successive flights, the first of which is toward the magazine and the second of which is away from the magazine. The selector should be coordinated in such manner that it will occupy a position corresponding to the shuttle which is approaching the magazine on the first of its pair of flights, and during the second of the pair of flights the selector should be coordinated with the shuttle which will be active on the next pair of flights. If the next pair of flights is by the same shuttle the selector mechanism will remain stationary and its location will be determined by the jack remaining at rest but nevertheless acting as a coordinator. If, on the other hand, a shuttle after indicating weft exhaustion is to pass out of action after completing the second of its pair of flights the selector will be coordinated with the other shuttle. To the extent indicated, therefore, the jack 61 or its equivalent serving as a coordinator can be independent of both the box operating mechanism and the box indicating mechanism shown in Fig. 23.

The hooks 27 and 28 and parts connecting them to their respective pawls may be considered as operating means for the pawls and the normally stationary lever 20 may be considered to be an operator for the operating means and the latch 17 and parts moving it in a vertical direction may be considered as an actuator for the operator. The chain 242 and its sprockets may be considered as gearing for the magazine and the arms 192 and 215 may be considered as a lever with the stud 195 forming a part thereof and extending into the slot 196. The magazine will have two degrees of angular motion depending upon which of the two shuttles adjacent to the transfer station is to be moved to the latter. Each of the turning means for the magazine includes a ratchet and its pawl and the corresponding hook. For convenience in the description a beat of the loom has been set forth as one complete reciprocation of the lay beginning at one back center position and ending at the next back center position. It is to be understood that the jack 61 moves ahead of and therefore anticipates any shift of the gang G which it calls. The parts mounted on the stand or support 117 including the two ratchets and their respective pawls and operating levers may be considered to be an assembly unit, and those parts shown for instance in Figs. 20 and 21 between the jack and the connections to the color slide may be considered to be coordinating means.

The modified form of the invention shown in Figs. 26-32 has the advantage over the form of invention already described of permitting the time of the dobby to be changed with respect to the loom time without requiring additional adjustment for the control of the selector mechanism and the shifting shuttle boxes. Referring to Fig. 26 the dobby D1 has mounted thereon the usual small horizontal shaft 300 to which a worm 301 is held for angular adjustment by a set screw 302. The worm meshes with a worm wheel 303 which is operatively connected to a pattern cylinder 304 around which the pattern chain 305 is trained. One rotation of the shaft 300 causes the cylinder 304 to advance the next bar of the pattern chain 305 into control position. Since the dobby is of the double index type the turning of the shaft 300 occurs once every second beat of the loom, and this is accomplished by securing a relatively large sprocket wheel 306 to the shaft 300 and training around it at chain 307 which is trained around a second sprocket 308 of half the size sprocket 306 rotating once for each beat of the loom. These parts of the mechanism shown in Fig. 26 as well as other well-known parts shown but not specifically described are all of common construction and operate in the usual manner.

In carrying the modified form of the invention into effect a cam 310 is secured by set screw 311 to the left-hand end of shaft 300, Fig. 26. This cam is of the grooved type and has a high area 312 and a low dwell 313. The cam groove 314 receives a roll 315 rotatable on a lever 316, Fig. 29, pivoting about a fixed axis and connected to the lower end of a rod 317 the upper end of which is pivoted on a stud 318 carried by a knife arm 319 but adjustable therealong in slot 320. The knife arm is rockable about a stationary stud 321 and is provided with a knife 325 for cooperation with right-hand and left-hand hooks 326 and 327 respectively. The lower ends of the hooks are pivoted to opposite ends of a rock lever 328 pivoted on a stationary stud 329, and their upper ends pass through a guide 330 on the lower end of a positioning lever 331 rockable on a fixed stud 332. The upper end of the positioning lever 331 has an arm 333 on which is pivoted a block 334 through which extends a rod 335, see Fig. 32. A compression spring 336 surrounds rod 335 between the block and a collar 337 fastened to the rod, and a nut 338 on rod 335 is normally held against the block by spring 336.

The right-hand end of rod 335, Fig. 26, is pivoted to an arm 340 fixed to a stub shaft 341 rockable on a stationary bearing 342. A second arm 343 is secured to shaft 341 and is pivoted at 344 to an arm 345 which is an integral part of a modified form of dobby finger 346. This finger is supported in usual manner on the ordinary finger supporting rod 347, and is provided with the usual curved run 348 for engagement with a dobby peg 349, see Fig. 30. As the pattern chain is advanced at two pick intervals its bars 350 pass successively under finger 346. A peg on any bar 350 under the finger will cause the latter to be in high position to hold the pivot 344 to the left, Fig. 26, thereby causing spring 336 to rock lever 331 to the position shown in Fig. 26 with the hook 327 over knife 325. If on the other hand there is no peg to lift the finger 346 the latter will be in its down position corresponding to rearward displacement of guide 330 to locate hook 326 in the path of knife 325.

The rocking lever 328 is formed with an upstanding arm 355 on which is rotatably mounted a roll 356 for movement along slot 357 in a setting lever 358 pivoted on a fixed stud 359. The forward or right end of lever 358 as viewed in Fig. 26 is pivoted to a downwardly extending rod 360 which corresponds to rod 224 shown for instance in Fig. 19 and performs the same functions and is operatively connected to the same mechanisms. The cam 310 is set on shaft 300 so that its high area raises knife 325 immediately after the weft detector has detected weft at front center when there is a shuttle at the detector end of the loom. This setting of the cam remains the same without regard to any adjustment of time of the dobby, or of worm 301 on shaft 300. The modified form can be used in place of the jack 61 and parts associated with it shown in Figs. 19, 20, 21, 22 and 24. The knife 325 will rise during the second of the two picks controlled by a chain bar 350 just after the lay passes front center and before the shuttle at the magazine end is picked to the drop box end. The operating parts intermediate the shaft 300 and rod 360 may be considered to be actuating means for the parts shown in Fig. 23 which constitute control mechanism for the shuttle boxes and the selector mechanism.

The cam in the modified form acts to move rod 360 at about the same time that jack 61 causes movement of rod 224, so that indication for a shuttle box shift and selector movement will occur at substantially the same time in both forms of the invention, and the detailed description of operation incident or following movement of rod 224 for the preferred form applies equally well to movement of rod 360 in the modified form.

Having now particularly described and ascertained the nature of the invention and in what manner the same is to be performed, what is claimed is:

1. In a weft replenishing loom operating with two shuttle boxes and shuttle box operating mechanism to move either shuttle box into active position, indicating mechanism acting prior to the beginning of an operation of the operating mechanism to set the latter for the operation thereof, a rotary magazine having two types of bobbins arranged alternately therein, one type for each shuttle box, the magazine having a transfer station normally unoccupied by a bobbin and having one bobbin of one type adjacent to said station and having another bobbin of the other type spaced from said station by said one bobbin, two ratchets operatively connected to the magazine causing the latter to turn when either ratchet turns, a pawl for each ratchet, the teeth of one ratchet being staggered midway between the teeth of the other ratchet and the pawls when operating having equal working strokes, selector means positioned by the indicating mechanism prior to operation of the box operating mechanism, an operating means for each pawl, a normally stationary operator for the operating means, and an actuator for the operator having a working stroke immediately following positioning of the selector means by the indicating mechanism, the selector means effective when a weft replenishing operation is to occur to connect the actuator to the operator and to determine which of said operating means shall be operated by the operator, one of said ratchets and the pawl therefor when operated by the operating means therefor acting to turn the magazine to move said one bobbin to said transfer station and the other ratchet and pawl therefor when operated by the corresponding operating means acting to turn the magazine to move said other bobbin to said transfer position.

2. In a weft replenishing mechanism comprising a rotary magazine having bobbins of two distinctive types arranged alternately therein, the magazine having a transfer station normally unoccupied by a bobbin and having one bobbin of one type adjacent to said station and having another bobbin of the other type spaced from said station by said one bobbin, gearing to move the magazine in a direction to move the bobbins toward said transfer station, and actuating means for the gearing comprising two ratchets and a pawl for each ratchet, the teeth of one of said ratchets being staggered midway of the teeth of the other ratchet, the pawls having equal working strokes when operating, one of said pawls when having a working stroke causing the corresponding ratchet to move the gearing to turn the magazine to place said one bobbin of one type in said transfer station and the other pawl when having a working stroke thereafter but prior to another working stroke of said one pawl causing the ratchet corresponding thereto to move the gearing to turn the magazine to place said other bobbin of the other type in said transfer station.

3. In a rotary bobbin magazine moving assembly for a loom having a frame and two operating members, a stand for attachment to the loom frame, a shaft for operative connection to the magazine supported by and rotatable with respect to the stand, a pair of ratchets, one for each operating member, secured to the shaft, the teeth of one ratchet being staggered angularly around said shaft with respect to the teeth of the other ratchet by an amount equal to one half the length of a ratchet tooth, two pawls, one for each ratchet and the corresponding member, mounted to swing around said shaft, a lever for each pawl and the corresponding operating member mounted for angular movement with respect to said lever having provision for attachment to the corresponding operating member, and connections between each lever and the corresponding pawl whereby angular movement of either lever about the axis thereof will cause angular movement of the corresponding pawl for actuation of the ratchet associated therewith.

4. In a rotary bobbin magazine moving assembly for a loom having a frame and two operating members, a stand for attachment to the loom frame, a shaft for operative connection to the magazine supported by and rotatable with respect to the stand, a pair of ratchets, one for each operating member, secured to the shaft, the teeth of one ratchet being staggered angularly around said shaft with respect to the teeth of the other ratchet by an amount equal to one half the length of a ratchet tooth, a pawl lever for each ratchet rockable on said shaft, a pawl on each pawl lever for the corresponding ratchet, and an actuating lever for and operatively connected to each pawl lever and having provision for attachment to the corresponding operating member supported by the stand and rockable about an axis parallel to but spaced from said shaft.

5. In a weft replenishing loom provided with a lay having two shifting shuttle boxes at one end thereof which are shiftable on alternate beats of the loom during a period when the lay is in the forward part of its motion and the lay having a single shuttle box at the other end thereof, a rotary magazine having two types of bobbins, one for each shuttle box, arranged alternately therein, the magazine requiring turning to place a bobbin in position for transfer, a weft detector which performs a weft detecting operation on the intermediate beats of the loom with respect to a shuttle in the single box when the lay is on approximately the front center position thereof, a selector mechanism to store an indication of weft exhaustion given by the detector, a dobby jack controlling the shifting shuttle boxes and having a motion during the time the lay is in said forward part of its motion and the detector is performing a detecting operation, connections between the jack and selector mechanism, a lost motion device in said connections by which the first part of the motion of the jack is ineffective to move the selector mechanism during the time the detector is performing a weft detecting operation and thereafter effecting motion of the selector mechanism by the jack subsequent to the detecting operation of the detector and prior to completion of the following period of shifting of the shuttle boxes, and means controlled by the selector mechanism effective immediately upon completion of the motion of the selector mechanism to initiate turning of the magazine, provided a weft replenishing operation is to occur.

6. The loom set forth in claim 5 wherein said lost motion device is a rod attached to the jack and having a slot therein receiving a part of said connections.

7. The loom set forth in claim 5 wherein said lost motion device includes a rod attached to the jack and having a slot therein receiving a part of said connections, a lock for said connections holding the latter and said part thereof against motion during said first part of the motion of the jack, the latter moving the rod to unlock said lock subsequent to the detecting operation of the detector, and a spring thereupon acts to cause said rod to move said part in said slot to move the connections to effect motion of the selector mechanism.

8. In a weft replenishing loom operating with two shuttles which are active one at a time, each shuttle when active having at least one pair of successive flights during the first of which the shuttle moves toward the replenishing end of the loom and during the second of which the shuttle moves away from said replenishing end, a rotary magazine at the replenishing end of the loom having two types of bobbins, one type for each shuttle, arranged alternately therein and requiring one degree of angular motion to place a bobbin of one type in transfer position and requiring another degree of angular motion to place a bobbin of the other type in transfer position, two normally stationary turning means, one for each shuttle, operatively connected to the magazine, one of said turning means effective when actuated to move the magazine through said one degree of angular motion and the other turning means effective when actuated to move the magazine through said other degree of angular motion, normally stationary operating means for actuation of said turning means, one at a time, effective when actuated to actuate the turning means registered therewith, selector means capable of assuming two positions, one for each shuttle, coordinated as to the position thereof with the shuttles and being in one position thereof when one of said shuttles is at said replenishing end and being in the other position thereof when the other of said shuttles is at said replenishing end and being coordinated as to position during flight of a shuttle away from said replenishing end with the shuttle to be active in the next pair of flights, connections between the selector means and turning means causing one of said turning means to register with said operating means when the selector is in said one position thereof and causing the other turning means to register with the operating means when the selector is in the other position thereof, and a regularly moving actuator controlled by the selector operative during a flight of a shuttle away from said replenishing end to actuate said operating means and cause actuation of the turning means registered therewith, provided the shuttle to be active during said next pair of flights requires replenishment.

9. In a weft replenishing loom provided with a reciprocating lay and operating with two shuttles which are active one at a time and each shuttle when active having at least a pair of successive flights along the lay the first flight of which is toward one end of the loom and the second flight of which is toward the other end of the loom, a rotary magazine at said one end of the loom requiring a turning movement to move a bobbin therein to transfer position, a weft detector at said one end of the loom to perform a weft detecting operation with respect to a shuttle at said one end of the loom when the lay is on the front center position thereof, selector means capable of assuming two positions, one position for each shuttle, coordinating means for the selector means locating the latter in the position thereof corresponding to the shuttle at said one end of the loom until after the weft detector has performed the detecting operation thereof and thereafter effective during said second flight of the shuttle to locate the selector in the position thereof corresponding to the shuttle which will be active in the next pair of shuttle flights, and means controlled by the selector means set into motion during said second flight of the shuttle to effect turning of the magazine, provided the shuttle active in the first pair of shuttle flights is also to be active during said next pair of shuttle flights.

10. In means for coordinating the position of the movable selector mechanism of a multishuttle weft replenishing loom having a rotary reserve bobbin magazine with the next shuttle to be active, the loom having a lay which reciprocates from one back center position to the next back center position thereof each beat of the loom and having also a weft detector which performs a detecting operation when a shuttle is at the magazine end of the loom and the lay is on the front center position thereof, a member which has a movement throughout substantially a beat of the loom and is in motion before and after the lay is on its front center position when a different shuttle is to be called into action, connections for moving the selector mechanism, and lost motion means between the member and said connections enabling said member to move without moving said connections until after the detector has performed its detecting operation and thereupon transmitting force from the member during the latter part of the motion thereof to said connections to effect movement of the selector mechanism to a position corresponding to said different shuttle.

11. The means set forth in claim 10 wherein said lost motion means includes a connector attached to the member having a slot therein and lever means is operatively connected to said connections and has a part thereof extending into said slot.

12. The means set forth in claim 10 wherein said member has a motion in one direction on one beat of the loom and moves in an opposite motion on a later beat of the loom, and the lost motion means includes a connector attached to the member having a slot therein and a lever means attached to said connections has a part thereof extending into said slot, a lock for said lever means effective to lock said lever means during the latter part of the motion of said member when the latter is moving in said one direction, and spring means acting on said member effective when the latter moves in said opposite direction to cause said connection to unlock and move said lever means to move said connections during the latter part of said opposite motion of said member.

13. In selector mechanism coordinating means for a weft replenishing loom operating with at least two shuttles which are active one at a time for at least a pair of flights the first of which is toward the replenishing end of the loom and the second of which is away from said end of the loom, the selector mechanism being movable to different positions, one for each shuttle, and determining when a weft replenishing operation is to occur, said coordinating means including a member which has a motion beginning during the first flight of a pair of flights of a given shuttle and ending during the second flight of said pair of flights of the given shuttle in anticipation of a different shuttle being active during the next pair of flights, a weft detector which performs a detecting operation when the given shuttle is at the replenishing end while the member is moving and gives an indication of exhaustion, provided the given shuttle is depleted of weft, means storing such indication in the selector mechanism, connections for moving the selector mechanism to said positions thereof, and a lost motion means operatively interposed between said connections and said member enabling said member to have part of said motion thereof without moving said selector mechanism until after the detector performs its detecting operation and immediately thereafter during the remainder of said motion of the member to locate said selector mechanism in a position corresponding to the shuttle which will be active during the next pair of flights.

14. In a weft replenishing loom provided with a lay having two shifting shuttle boxes at one end thereof which are shiftable on alternate beats of the loom during a period when the lay is in the forward part of its motion, the lay also having a single shuttle box at the other end thereof, a rotary magazine having two types of bobbins, one for each shuttle box, arranged alternately therein, the magazine requiring turning to place a bobbin therein in position for transfer, a weft detector which performs a weft detecting operation on the intermediate beats of the loom with respect to a shuttle in the single box when the lay is on approximately the front center position thereof, a selector mechanism to store an indication of weft exhaustion given by the detector, control mechanism controlling the shifting shuttle boxes and the position of the selector mechanism, actuating means causing movement of the control mechanism to position the selector mechanism after the detecting operation of the weft detector and prior to completion of the following period of shifting of the shuttle boxes, and means controlled by the selector mechanism effective immediately upon completion of the motion of the selector mechanism to initiate turning of the magazine, provided a weft replenishing operation is to occur.

15. The loom set forth in claim 14 wherein the actuating means includes a shaft turning continuously in time with the loom and rotating once for every two beats of the loom and a knife which due to turning of the shaft is moved to effect movement of the control mechanism after the weft detector has performed a weft detecting operation.

16. The loom set forth in claim 14 wherein the actuating means includes a shaft turning in time with the loom and rotating once for every two beats of the loom and a cam on the shaft comes into action to move the control mechanism after the weft detector has performed a detecting operation.

17. The loom set forth in claim 14 wherein the actuating means includes a knife having a regularly recurring movement every other beat of the loom, two hooks, and a pattern chain controlled finger is operatively connected to the hooks to place one or the other of the hooks for cooperation with the knife, depending upon the position of the finger, and means rotating in time with the loom causes said knife to have said regularly recurring movements after the weft detector has performed a detecting operation.

18. In a weft replenishing loom provided with a lay having two shifting shuttle boxes at one end thereof which are shiftable on alternate beats of the loom during a period when the lay is in the forward part of its motion, the lay having also a single shuttle box at the other end thereof, a rotary magazine having two types of bobbins, one for each shuttle box, arranged alternately therein, the magazine requiring turning to place a bobbin therein in position for transfer, a weft detector which performs a weft detecting operation on the intermediate beats of the loom with respect to a shuttle in the single box when the lay is on approximately the front center position thereof, a selector mechanism to store an indication of weft exhaustion given by the detector, a cam rotating once for every other beat of the loom, a knife given an upward movement by the cam every second beat of the loom after the weft detector has performed a detecting operation, two hooks, a pattern chain controlled finger to be in either high or low position operatively connected to said hooks to locate one or the other of said hooks for cooperation with said knife, connections intermediate the hooks and selector mechanism to effect movement of the latter, if necessary, subsequent to said detecting operation of the weft detector, and means controlled by the selector mechanism effective immediately upon completion of the movement of the selector mechanism by said connections to initiate turning of the magazine, provided a weft replenishing operation is to occur.

19. The loom set forth in claim 18 wherein the cam is secured to a shaft which rotates once every other beat of the loom and a worm secured to the shaft in angularly adjusted position thereon causes movement of a pattern chain which determines the high and low positions of said finger.

References Cited in the file of this patent

UNITED STATES PATENTS

| 671,202 | Baker et al. | Apr. 2, 1901 |
| 1,045,443 | Ryone | Nov. 26, 1912 |
| 1,627,310 | Blackston | May 3, 1927 |
| 2,125,470 | Wigit | Aug. 2, 1938 |

FOREIGN PATENTS

| 713,029 | France | Aug. 10, 1931 |